US008277045B2

(12) United States Patent
Hobbs

(10) Patent No.: US 8,277,045 B2
(45) Date of Patent: *Oct. 2, 2012

(54) TRI-COLORED LENS FOR SPECTACLES

(75) Inventor: Raymond L. Hobbs, Tulsa, OK (US)

(73) Assignee: Sky Sight Vision, Inc., Tulsa, OK (US)

( * ) Notice: Subject to any disclaimer, the term of this patent is extended or adjusted under 35 U.S.C. 154(b) by 32 days.

This patent is subject to a terminal disclaimer.

(21) Appl. No.: 13/012,307

(22) Filed: Jan. 24, 2011

(65) Prior Publication Data

US 2011/0134386 A1 Jun. 9, 2011

Related U.S. Application Data

(60) Continuation of application No. 12/964,376, filed on Dec. 9, 2010, now Pat. No. 8,042,936, which is a division of application No. 12/029,088, filed on Feb. 11, 2008, now Pat. No. 7,862,165, which is a continuation-in-part of application No. 11/421,355, filed on May 31, 2006, now Pat. No. 7,328,998.

(51) Int. Cl.
G02C 7/16 (2006.01)
(52) U.S. Cl. .......................... 351/45; 351/46
(58) Field of Classification Search .................... 351/45, 351/46, 44, 41, 158, 159
See application file for complete search history.

(56) References Cited

U.S. PATENT DOCUMENTS

| 1,067,793 | A | 7/1913 | Barr |
| 1,257,667 | A | 2/1918 | Barr |
| 1,637,406 | A | 8/1927 | Brumder |
| 1,706,429 | A | 3/1929 | Willard |
| 2,045,399 | A | 6/1936 | McMurdo |
| 2,076,432 | A | 4/1937 | Kinney |
| 2,409,356 | A | 10/1946 | Hutchings |
| 3,791,722 | A | 2/1974 | Ahlberg et al. |
| 4,168,111 | A | 9/1979 | Baines |
| 4,338,003 | A | 7/1982 | Adrian |
| 4,824,234 | A | 4/1989 | Sparks et al. |
| 5,177,510 | A | 1/1993 | Peters et al. |
| 5,189,445 | A | 2/1993 | Stagner |
| 5,432,568 | A | 7/1995 | Betz et al. |
| 5,440,359 | A | 8/1995 | Bloch-Malem |
| 5,682,220 | A | 10/1997 | Sherman et al. |
| 5,975,695 | A | 11/1999 | Baiocchi et al. |
| 6,450,636 | B1 | 9/2002 | Ylipelkonen |
| 6,623,116 | B2 | 9/2003 | Kerns, Jr. et al. |
| 6,692,127 | B2 | 2/2004 | Abitbol et al. |
| 7,328,998 | B2 * | 2/2008 | Hobbs .......................... 351/45 |

* cited by examiner

Primary Examiner — Hung Dang
(74) Attorney, Agent, or Firm — Head, Johnson & Kachigian, P.C.

(57) ABSTRACT

A specially tinted lens, a tri-colored lens for spectacles and sunglasses for use in flying airplanes. A far field of vision has a first tinting, such as green, to reduce the light from a sunlit sky, over sunlit cloud tops, or in clouds, which enables an aircraft pilot to easily see out of the cockpit into highly illuminated environments. An intermediate field of vision has a second tinting, such as yellow, to enable the pilot to easily see a dimly illuminated instrument panel as compared to outside the aircraft. A near field of vision has a third tinting, such as neutral in color, to enable said pilot to easily view maps and other information.

22 Claims, 9 Drawing Sheets

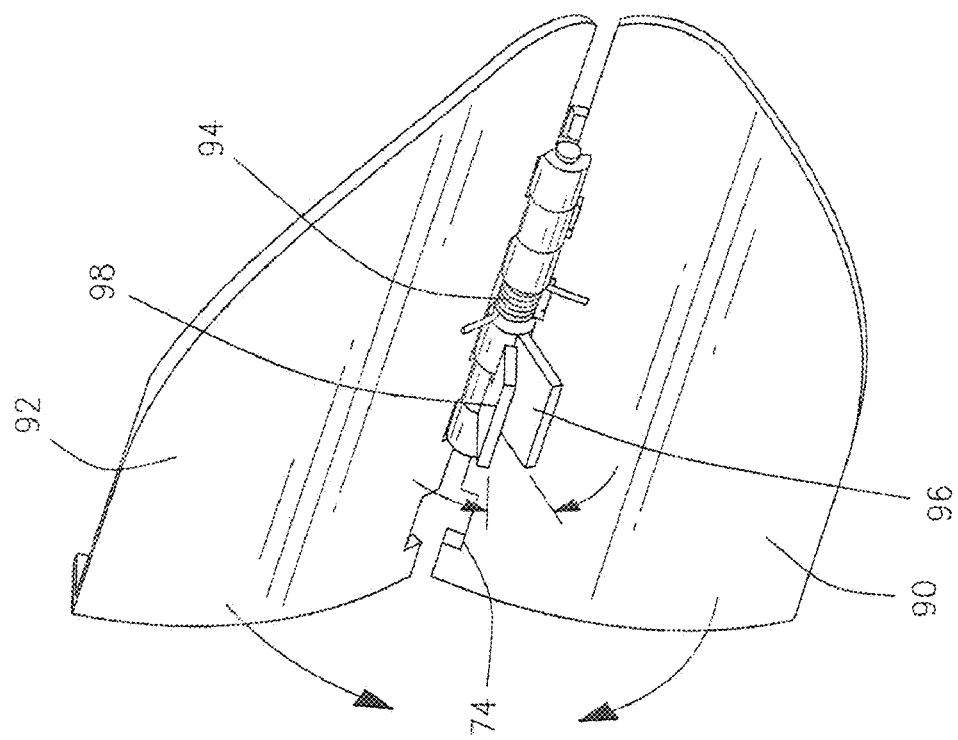
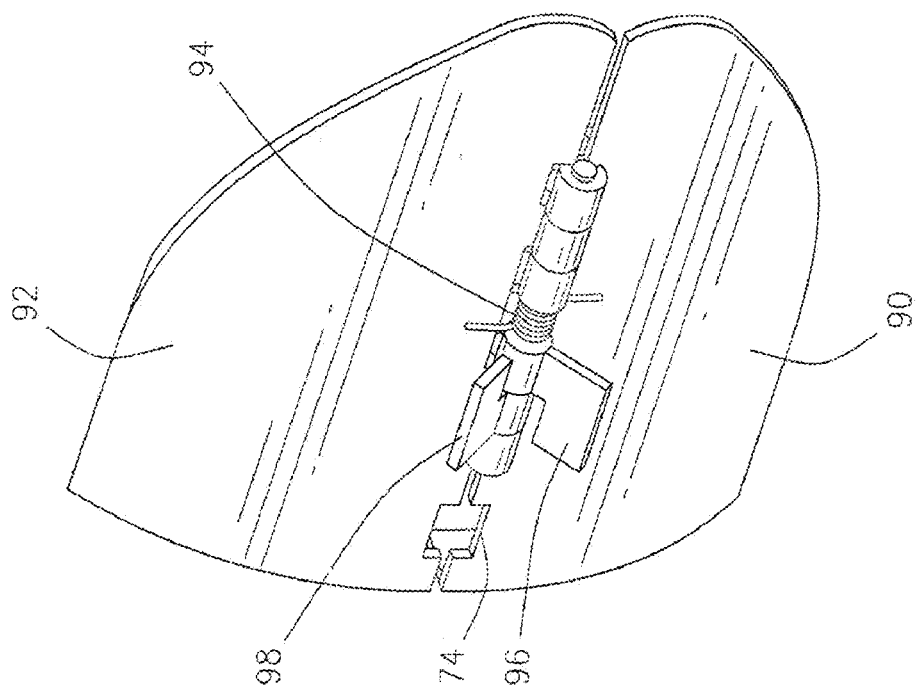
FIG. 8B
FIG. 8A

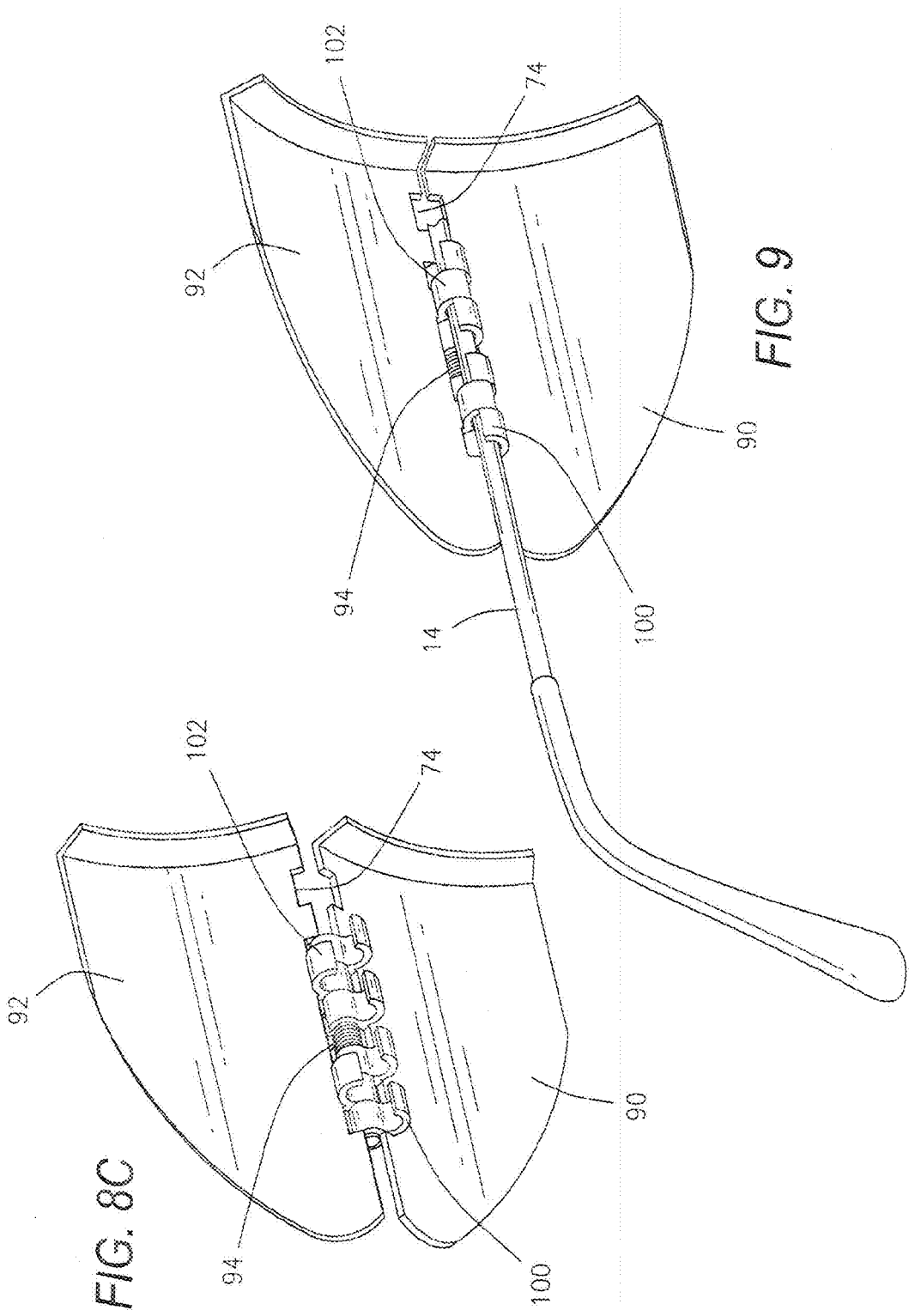

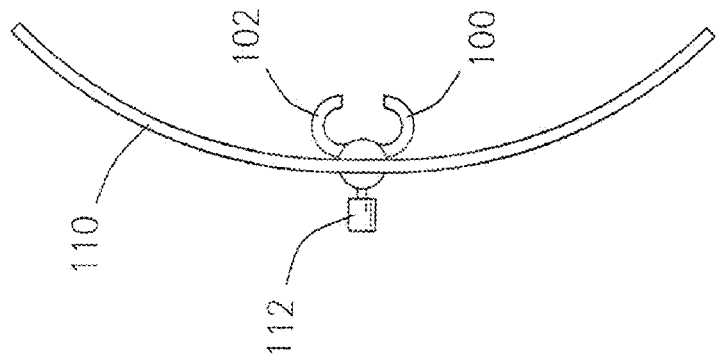
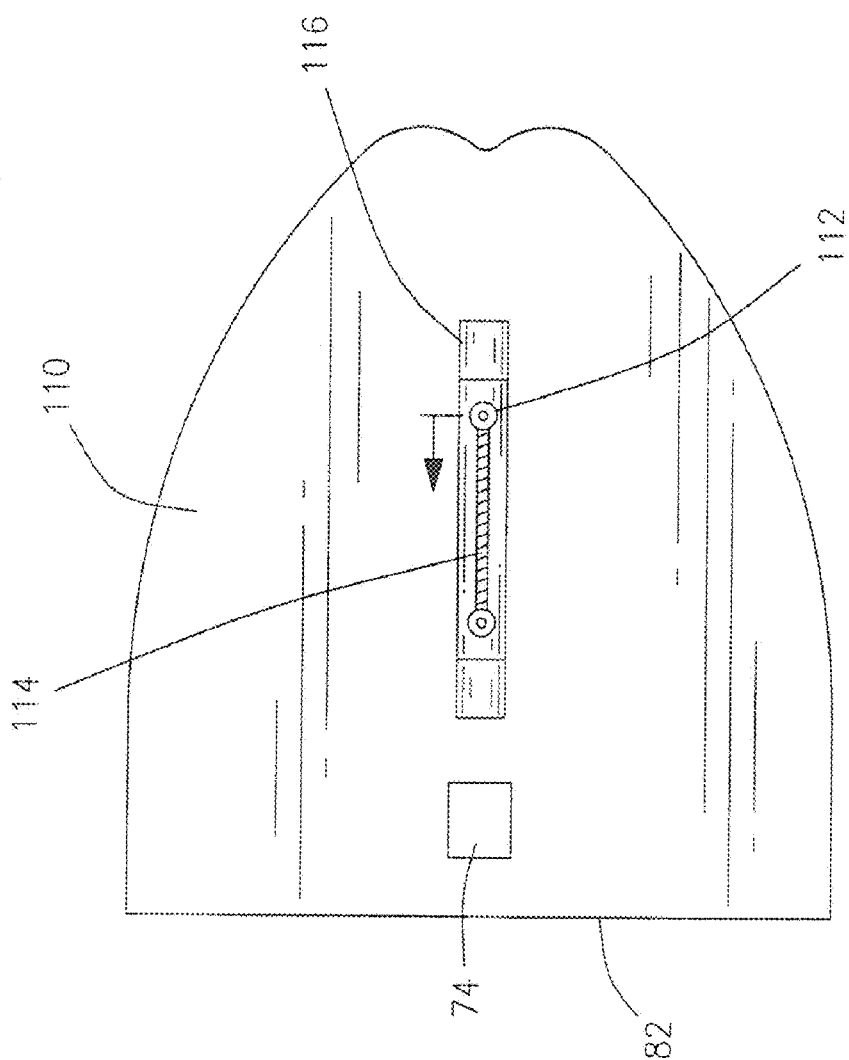
FIG. 10A
FIG. 10B

TRI-COLORED LENS FOR SPECTACLES

CROSS-REFERENCE TO RELATED APPLICATIONS

This application claims priority to and is a continuation of U.S. patent application Ser. No. 12/964,376, filed Dec. 9, 2010, now U.S. Pat. No. 8,042,936, which is a divisional of U.S. patent application Ser. No. 12/029,088, filed Feb. 11, 2008, now U.S. Pat. No. 7,862,165, which is a continuation-in-part of U.S. patent application Ser. No. 11/421,355, filed May 31, 2006, now U.S. Pat. No. 7,328,998, each of which is incorporated herein by reference in its entirety.

BACKGROUND OF THE INVENTION

1. Field of the Invention

This invention relates to a tri-tinted lens for spectacles, and more particularly concerns a tri-colored lens for special-purpose sunglasses for use during flying a jet aircraft. These tri-colored lens reduce glare from high illumination in a far field of vision when viewing in an intermediate or near fields of vision. The tri-colored lens greatly improves the pilot's ability to see the instrument panel and make viewing between highly contrasting fields of vision less stressful to the eyes.

2. Description of the Related Art

In the field of optical wear, a wide variety of sunglasses and goggles have been developed over the years for various purposes, depending upon the specific function of the sunglasses or the activity involved while wearing the sunglasses. Optical wear has been created to reduce glare from point sources of light, such as from oncoming cars or from direct sunlight. Optical wear has also been created to reduce the glare from broad regions of high illumination, such as office lighting, sky glare, and ground glare. Optical wear also has been developed for directing sight into specific fields of vision. This type of eyewear enables the viewer to assume a correct posture or position for carrying out a physical activity; the great majority of the prior art in this application has been in developing golfing glasses. Finally, optical wear has been designed to reduce visual stress in contrasting lighting situations and to enhance feature extraction in different fields of vision, these types of optical wear can be useful during physical activities where it is desirable to see a specific object against a background, such as golfing, fishing, hunting or other outdoor recreational activities.

One area that prior art has not addressed is the situation encountered by pilots of jet aircraft, which are flown typically at altitudes between 35,000 and 45,000 feet. At these heights during the day, the illumination from outside the cockpit is especially high. The high illumination comes from scattered light from both the sky and clouds. Indeed, when flying over clouds, pilots typically experience illumination values around 9,000 lux even when they are not looking in the direction of the sun. By contrast, under these external lighting conditions, the illumination of the instrument panel can be typically around 30 lux. In this case, the ratio between the outside illumination to that of the instrument panel is 300 to 1. Making transitions between these two contrasting fields of illumination can be stressful to the eyes.

Of the variations of sunglasses disclosed in prior art, none has satisfactorily solved the problem of balancing the illumination between outside and inside the cockpit—a problem that pilots flying at altitude encounter. Ordinary dark sunglasses do not solve this problem; while they do reduce the outside illumination to a comfortable level for the pilot, they can render the instrument panel too dark for the pilot to discern readings on the gauges. On the other hand, vignetted sunglass lenses assist in the overall balancing of illumination outside the cockpit with that of the instrument panel, but they permit too much light to enter a pilot's eyes, thus causing glare when the pilot views the instruments.

The limitations of prior art described above highlight the need for sunglasses that specifically address the two and often related problems that many jet pilots routinely encounter when flying at altitude: that is, (1) the contrast in illumination causes stress on the pilot's eyes resulting from the eyes having to adjust back and forth between the high illumination from outside the cockpit and the low illumination from the instrument panel; and (2) the glare caused by the high illumination can degrade the ability of the pilot to adequately see the instruments. Moreover, these two problems are exacerbated as the pilot ages.

To fully understand the problem the specially tinted lens solve, it is helpful to define the difference between the horizon and the horizontal plane in which the aircraft is flying. The horizon is plane tangent to the earth's surface at an observer's position and the horizontal plane is perpendicular to the vertical axis to the earth. Between 35,000 ft and 45,000 ft the horizon is approximately 3.3° to 3.8° below the horizontal plane. Consequently, whenever the aircraft is above a uniform layer of cloud that extends to the horizon, the illumination from that cloud layer originates from below the horizontal plane.

The illumination that a pilot experiences when flying at these high altitudes can be significantly different from that experienced by a person on the ground. For example, when pilots fly above the clouds, the illumination experienced when they look horizontally and below is typically greater then when they look above the horizontal plane. This high illumination at and below the horizontal plane poses a unique problem for pilots when they look at the instruments, in that the high illumination from outside the cockpit can be relatively close to their intermediate field of vision of the instruments. The reverse tends to be the case for a person on the ground, where the illumination generally increases when looking upwards.

The specially tinted lens, when adapted to sunglasses, enable a pilot to easily view outside the cockpit into high illumination and simultaneously view the instrument panel in low illumination without the eyes having to compensate for the previously described problems of adjustment and glare. The specially tinted lens reduces visual stress to the eyes by greatly reducing the difference in illumination as received by the eyes between lighting outside the cockpit and the instrument panel. In addition, this reduction in light received by the eyes from outside the cockpit greatly reduces glare that can impair the pilot's vision of the instrument panel.

The specially tinted lens addresses the specific and unique condition present in the cockpit of a jet aircraft where the instrument panel and nose of the aircraft block the high illumination from outside the cockpit from entering the intermediate section of the lens.

SUMMARY OF THE INVENTION

In general, in a first aspect, the invention relates to a specially tinted lens for spectacles worn by a pilot for use while flying an airplane. The specially tinted lens includes a lens body having at least two distinct, contrasting tintings between at least three fields of vision. A first tinting is provided for a far field of vision to prevent high illumination from outside the airplane's cockpit from entering the pilot's eyes. The first tinting may have a first colored tinting with a filter category number between 2 and 6 (transmittance between 25% and 1.56%), averaged over the visible spectrum. A second tinting is provided for an intermediate field of vision to enable the pilot to easily see a dimly illuminated instrument panel and may have a second colored tinting with a filter category number less than or equal to the filter category number of the first colored tinting. A third tinting is provided for a near field of vision to enable the pilot to easily view maps and other information, and the third tinting for the near field of vision may have a third colored tinting with a filter category number greater than or equal to the filter category number of the second colored tinting and less than or equal to the filter category number of the first colored tinting.

The tintings of the specially tinted lens can be discontinuous and sharp between the at least three fields of vision. The lens body may be a prescription lens, and the first tinting can overlap with the intermediate field of vision and the near field of vision so as to prevent high illumination from outside the cockpit from interfering with the pilot's viewing of the airplane's instrument panel. Further, the tintings may be vignetted tinting, color tinting and/or photochromic, and the lens body can include UV protection, be impact resistant and/or be polarized. Moreover, the first tinting for the far field of vision may be tinted green, gray or brown, the second tinting for the intermediate field of vision may be tinted yellow, and the third tinting for the near field of vision may be tinted neutral in color.

In general, in a second aspect, the invention relates to a tri-colored lens for spectacles. The tri-colored lens includes a lens body having three distinct and contrasting colored tintings for three fields of vision. A first colored tinting, such as a green, gray or brown tint, has a filter category number between 2 and 6 (transmittance between 25% and 1.56%), averaged over the visible spectrum, a second colored tinting, such as a yellow tint, has a filter category number less than or equal to the filter category number of the first colored tinting, averaged over the visible spectrum, and a third colored tinting, such as a neutral in color tint, has a filter category number greater than or equal to the filter category number of the second colored tinting and less than or equal to the filter category number of the first colored tinting, averaged over the visible spectrum.

Similarly to the specially tinted lens, the tintings of the tri-colored lens may be discontinuous and sharp between at least three fields of vision. Further, the lens body can be a prescription lens, where the first colored tinting overlaps with an intermediate field of vision and a near field of vision on the lens body. Additionally, the tintings can be vignetted tinting and/or photochromic, while the lens body may include UV protection, be impact resistant and/or be polarized.

In general, in a third aspect, the invention relates to sunglasses having a frame and two lens bodies, each having three distinct and contrasting colored tintings. The sunglasses include a first colored tinting having a filter category number between 2 and 6 (transmittance between 25% and 1.56%), averaged over the visible spectrum, a second colored tinting having a filter category number less than or equal to the filter category number of the first colored tinting, averaged over the visible spectrum, and a third colored tinting having a filter category number greater than or equal to the filter category number of the second colored tinting and less than or equal to the filter category number of the first colored tinting, averaged over the visible spectrum.

The lens bodies of the sunglasses can be similar to the specially tinted lens or the tri-colored lens, namely the tintings may be discontinuous and sharp between at least three fields of vision. Further, the lens bodies can be prescription lenses, where the first colored tinting overlaps with an intermediate field of vision and a near field of vision on the lens bodies. Additionally, the tintings can be vignetted tinting and/or photochromic, while the lens bodies may include UV protection, be impact resistant and/or be polarized. Moreover, the first tinting may be tinted green, gray or brown, the second tinting may be tinted yellow, and the third tinting may be tinted neutral in color

BRIEF DESCRIPTION OF THE DRAWINGS

FIG. 8A is an outside perspective view of an example of a detachable sideshade in accordance with another illustrative embodiment of the detachable sideshade disclosed herein;

FIG. 8B is an outside perspective view of the detachable sideshade of FIG. 8A in the open position;

FIG. 8C is an inside perspective view of the detachable sideshade of FIG. 8B;

FIG. 9 is an inside perspective view of the detachable sideshade of FIG. 8A attached to sunglasses;

FIG. 10A is a side perspective view of an example of a detachable sideshade in accordance with another illustrative embodiment of the detachable sideshade disclosed herein;

FIG. 10B is an end perspective view of the detachable sideshade of FIG. 9A; and

Figure 1:
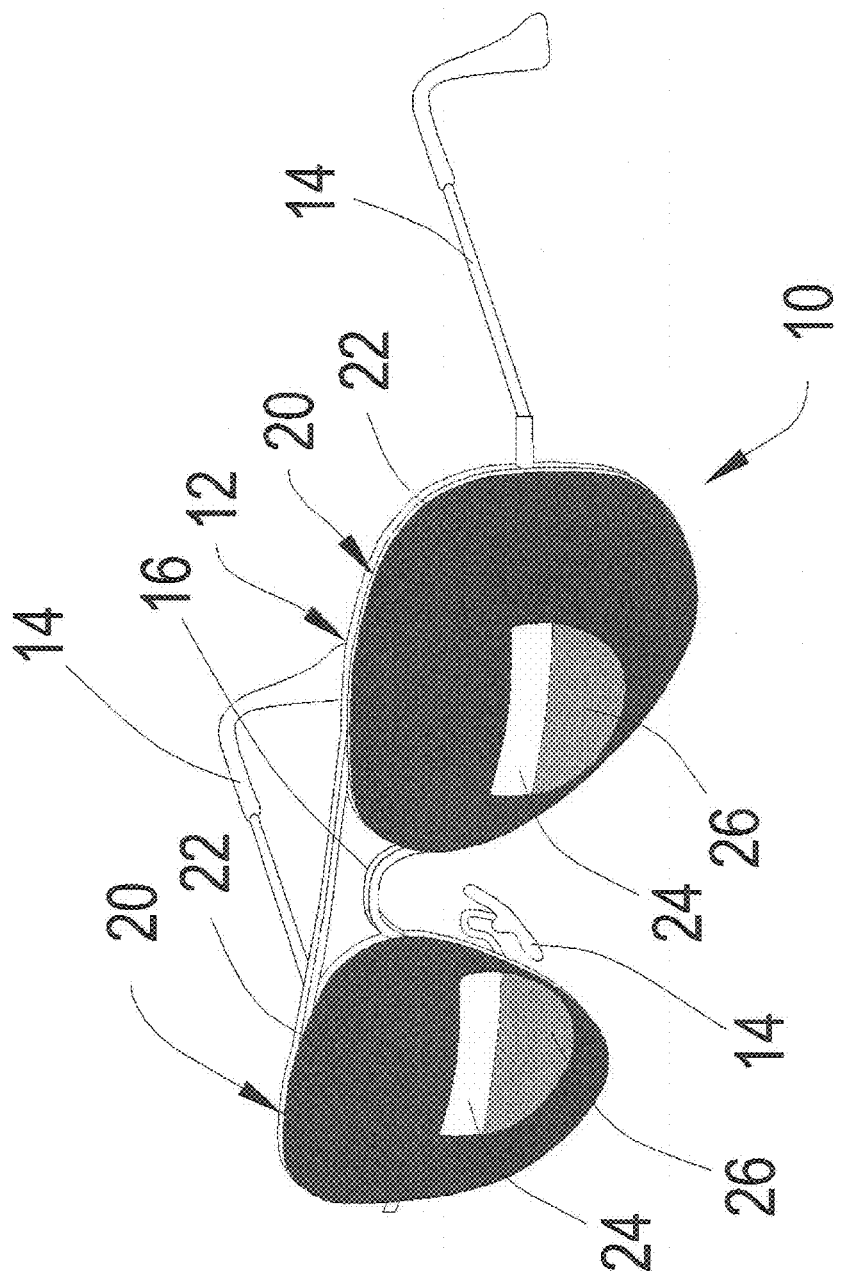
FIG. 1 is a perspective view of an example of a pair of sunglasses with specially tinted lenses suitable for wearing while flying an airplane in accordance with an illustrative embodiment of the special-purpose sunglasses disclosed herein.

Other advantages and features will be apparent from the following description, and from the claims.

DETAILED DESCRIPTION OF THE INVENTION

The devices discussed herein are merely illustrative of specific manners in which to make and use this invention and are not to be interpreted as limiting in scope.

While the devices have been described with a certain degree of particularity, it is to be noted that many modifications may be made in the details of the construction and the arrangement of the devices and components without departing from the spirit and scope of this disclosure. It is understood that the devices are not limited to the embodiments set forth herein for purposes of exemplification.

Under the specially tinted lenses for use in flying airplanes, the far field of vision has medium to exceptionally dark tinting (Filter category between 2 and 6) to reduce the light from a sunlit sky, over sunlit cloud tops, or in clouds. This enables an aircraft pilot to easily see out of the cockpit into highly illuminated environments. The intermediate field of vision is color tinted to enable the pilot to easily see a dimly illuminated instrument panel as compared to the high illumination outside that aircraft. The near field of vision may have a range of tinting from clear (Filter category 0) to medium (Filter category 3) for reading maps, etc. In addition, the change in tinting is discontinuous (i.e., sharp) from one field of vision to another. The specially tinted lenses work because the aircraft structure (i.e., nose and instrument panel) substantially blocks outside light from coming into the intermediate field of vision where the lens is clear.

The density of the tinting on the lenses is based on the European Standard EN1836:1997. Under this standard, the density of the tinting of the sunglasses is numerically categorized as given in the following table:

| Filter Category Number (N) | Calculated Transmittance (T) | Approximate Transmittance Range | Density of Tinting on On Lenses | Brightness of Environment |
|---|---|---|---|---|
| 0 | 100.% | 80% to 100% | Clear or very light | Dim |
| 1 | 50.% | 43% to 80% | Light | Normal |
| 2 | 25.% | 18% to 43% | Medium | Normal |
| 3 | 12.5% | 8% to 18% | Dark | High |
| 4 | 6.25% | 3% to 8% | Very Dark | Exceptionally High |

The calculated transmittance (T) is the percentage of visible light that is transmitted through the lens as compared to the incident light onto the lens. T is related to the filter category number (N) as given in the following equation:

$$T = \left(\frac{1}{2}\right)^N \cdot 100 \quad \text{(Equation 1)}$$

The concept of the filter category is extended for values of N of 5 and 6 having a calculated transmittances of 3.13% and 1.56%, respectively and represent exceptionally dark tinting. The use of filter category numbers (N) to describe the tinting of sunglasses is practical because the eye can sense change in filter density for one category number to the next. However, N is not restricted to integer values when relating it to transmittance values T.

The specially tinted lenses are application-specific; that is, one cannot expect sunglasses made with these specially tinted lenses to be suitable for general use. The specially tinted lenses work properly only in an aircraft cockpit or other such environment where a barrier substantially blocks the high ambient illumination from the intermediate and near viewing areas on the lens.

The tinting density and the pattern of the different tinting areas on the specially tinted lenses may be custom made for the specific aircraft type because of the variations in shapes of the instrument panels and glare shields. The pattern of tinting may need to be customized depending on which seat the pilot may be sitting. Lastly, the density and type of tinting may need to be optimized for a pilot flying in tropical, temperate regions, or sub-arctic regions.

Observations in the sub-arctic region indicate particularly high contrasting viewing conditions at altitude between outside the cockpit and the instrument panel. In this region, cloud tops are typically lower than found in temperate or tropical regions and thus jet aircraft are typically more frequently above cloud tops in the sub-arctic than in temperate or tropical regions. In addition, lower sun angles with respect to the horizon in the sub-arctic as compared to the temperate or tropical regions probably produce less illumination coming into to the cockpit from above the horizontal plane which illuminates the interior of the cockpit, including the instrument panel. This puts the pilot in a viewing situation where the horizon can be brilliantly lit but the instrument panel is dimly lit.

The specially tinted lenses are not limited to being mounted in just ordinary spectacles or sunglasses. The lenses can be mounted in "clip on" sunglasses, mounted in goggles wherein the goggles can have a single lens with tinting applied in front of the eyes, or the tintings can be applied to a visor that typically is part of a helmet used for flying.

The tri-tinting on the lenses is considered to be of neutral density. However, color tintings that are typically used in aviator's sunglass, e.g., green, brown, and yellow, can be used. There is a discontinuity, or sharp contrast, between at least two of the viewing areas on the lens.

Vignetted tinting may also be used for the far field of viewing. In addition, the vignetted tinting on the sunglasses can have a gradient in the tinting opposite to that used on ordinary sunglasses. That is, the tinting can start off light at the top of the lens and increase in density towards the center of the lens. This would tend to block the high intensity of light coming from clouds below the horizontal plane when a pilot is viewing outside the cockpit.

The specially tinted lenses could be photochromic, have UV protection, could be impact resistant or could be polarized. In addition, the specially tinted lenses may be with or without correction (ophthalmic lenses) in any one or all of the fields of vision.

Referring to the figures of the drawings, wherein like numerals of reference designate like elements throughout the several views, and initially to FIG. 1, specially tinted lenses for use in flying airplanes. Sunglasses 10 can be of any conventional design, comprising two lenses 20 mounted to a frame 12, to which two temples 14 are hingedly attached. Frame 12 can be of any design, but usually includes a nose piece 14 and/or bridge 16 that supports frame 12 on the wearer's face. Lenses 20 are tri-tinted or tri-colored for the different fields of vision. A far field of vision area 22 (large dark grey portion) has dark tinting, intermediate field of vision area 24 (horizontal portion) has colored tinting, and near field of vision area 26 (small semi-circle portion) has light to medium tinting. The tinted fields of the lenses can be of any shape and can run predominantly horizontally, vertically or in any direction to best reduce the bright light and selectively allow dim light to reach the viewer's eyes.

To further reduce glare and improve the pilot's viewing of the instrument panel, the special-purpose sunglasses or any ordinary sunglasses, can include a tri-colored lens. An example of a tri-colored lens as illustrated by FIG. 2 could be the far field of vision 22 tinted green, brown or gray or any other color that enhances vision for aviators (e.g., BPI® Aviator Gray-15, BPI® Aviator Brown-15, BPI® G-15 RayBan®, the intermediate field of vision 24 tinted yellow or any other color to reduce glare (e.g., BPI® EVA® tints to reduce glare, eye strain and visual haze by attenuating those light frequencies most annoying to the eye), and the near field of vision 26 tinted neutral in color so as not to enhance or diminish the colors of the reading material.

Figure 2:
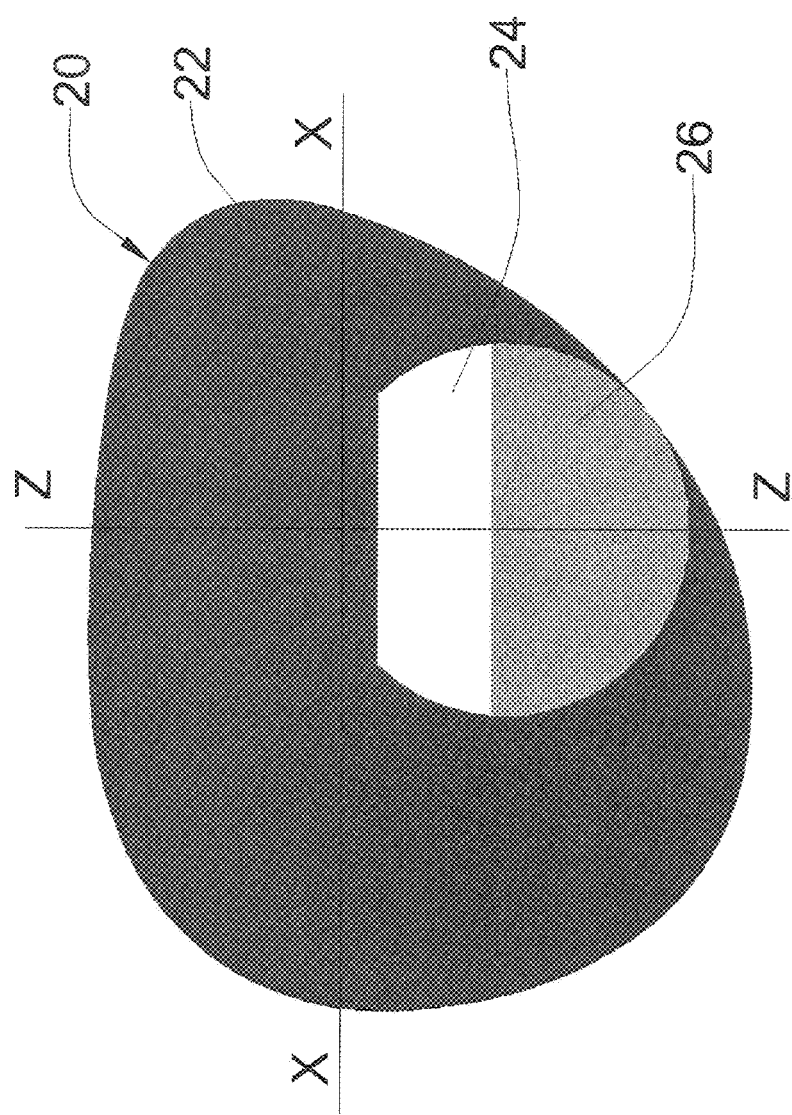
FIG. 2 is a perspective view of an example of a tri-tinted or tri-colored lens in accordance with an illustrative embodiment of the special-purpose sunglasses disclosed herein.

FIG. 2 illustrates lenses 20 as tri-tinted or tri-colored in order to reduce glare for the wearer when viewing in the near or intermediate field of vision from high illumination for the far field of vision. Lenses 20 may be used in either spectacles or sunglasses. Lenses 20 can be without power, i.e., non-prescription lenses, or a prescription lens with power in one or more of the three viewing zones.

Lenses 20 may have three different areas to enable the wearer to see in three fields of vision, a far field ($V_f$) 22 (typically where the eyes focus at infinity), an intermediate field of vision (V) 24 (where the eyes focuses at 32 inches (0.81 m)) and a near field of vision ($V_n$) 26 for reading (where the eyes focuses at 16 inches (0.41 m)). These distances are set forth in the Federal Aviation Agencies (FAA) standards required of a First Class Medical. 14 C.F.R. §67.103. In the particular embodiment, $V_f$ 22 is tinted with approximately a filter category value of 4 ($N_f$~4), $V_i$ 24 with $N_i$~0 and $V_c$ 26 with $N_c$~2. The line XX passes through the center of the far field of view area on lens 20. As can be seen in FIG. 2, the dark tint may extend below line XX approximately 2.5 mm at which point the lens transitions to the area for intermediate viewing and the lens is clear. The line ZZ passes though the centers of the intermediate 24 and near 26 fields of vision. The distance along ZZ is plotted as the ordinate (Y-axis) in FIG. 4 below.

Lenses 20 may have three distinct densities of tint. The tintings can be expressed as the transmittance through the lens or as filter category values. The tinting densities may be applied in general to the three fields of vision as described above. For far field viewing 22, the lens may have dark tinting, for example, a filter category number between 2 and 6 (transmittance between 25% and 1.56%). For intermediate field viewing 24, a filter category number may be zero, i.e., no tinting (transmittance of 100%). For near field viewing 26, a filter category value between 1 and 3 can be used (transmittance between 50% and 12.5%).

The range of filter category values and transmittances are quantified in the following table for the colored tinting, averaged over the visible spectrum:

| Lens Viewing Area | Filter Category Number | Transmittance |
| --- | --- | --- |
| $V_f$ | $2 \leq N_f \leq 6$ | $25\% \geq T_f \geq 1.56\%$ |
| $V_i$ | $0 \leq N_i \leq N_f - 1$ | $100\% \geq T_i \geq 2 \cdot T_f$ |
| $V_n$ | $N_i \leq N_n \leq N_f$ | $T_i \geq T_n \geq T_f$ | where:
$N_f$ is the filter category number of the first colored tinting in the far field of viewing area on the lens ($V_f$);
$N_i$ is the filter category number of the second colored tinting in the intermediate field of viewing area on the lens ($V_i$);
$N_n$ is the filter category number of the third colored tinting in the near field of viewing area on the lens ($V_n$);
$T_f$ is the transmittance of the tinting in $V_f$;
$T_i$ is the transmittance of the tinting in $V_i$; and
$T_n$ is the transmittance of the tinting in $V_n$.

It is envisioned that a pilot will initially evaluate a pair of these special purposes sunglasses having initial tintings as follows; $N_f$=4, $N_i$=0, $N_n$=2. Pilots can have the tintings changed as required for their situations.

On the ophthalmic trifocal, the tinting for distant viewing can cover some of the area on the intermediate portion of the lens so as to prevent high illumination from outside the cockpit from interfering with the pilot's viewing of the instrument panel. That is, for a typical trifocal lens the intermediate distant area on the lens may be larger than what is required to adequately view the instrument panel.

Light sources of excessive brightness or uneven distribution in the field of view can cause glare, which may in turn cause a mild sensation of discomfort or an intolerable feeling of pain. The physiological origins of this discomfort has been extensively studied and discussed by those skilled in the art. To reduce glare, it is imperative that high intensity illumination from outside the cockpit be substantially reduced before it reaches the pilot's eyes. For example, those skilled in the art recognize that the intensity of a glare source can be quantified.

U.S. Pat. No. 4,338,003 granted to Adrian describes an equation that relates the glare experienced to the intensity of the illumination that causes the glare. This formula takes into account the viewer's age as a factor of the glare illumination, and is referred to as "equivalent stray-light illumination:"

$$L_{saq} = \frac{K \cdot E_{B1}}{\theta^2} \qquad \text{(Equation 2)}$$

where $L_{saq}$ is intensity of the glare in candles/meter² (cd/m²); K is an age-dependent constant approximately 10 for the age group between 20 and 30, $E_{B1}$ is the illumination in lux (lx) produced by the source of glare in the plane of the eye normal to the direction of viewing, and $\theta$ is the angle between the viewed object and the centre of the source of glare in degrees.

The equivalent illumination in lux of the glare can be estimated from the intensity of the glare ($L_{saq}$) as follows:

$$E_{saq} = \frac{L_{saq}}{4 \cdot \pi} \qquad \text{(Equation 3)}$$

As stated above, the average illumination entering the cockpit of an airplane through the windshield can typically be 9,000 lux. The angle between the upper part of the instrument panel and the lower part of the windshield is approximately 12°. Applying these values to Equation 2, the intensity of the glare in the cockpit is approximately 625 cd/m², which results in an approximate equivalent illumination of 50 lux to the pilot's eyes (Equation 3). This indicates that the glare a pilot can experience while viewing the instruments can easily be of the order of the illumination of the instruments themselves.

The example above using Equation 2 to estimate the equivalent stray-light illumination is conservative if not underestimated by a factor of 10 because the illumination from outside the cockpit that strikes the pilot's eye was not integrated over the entire viewing scene. From practical experience in the sub-artic the glare can be so intense it is like viewing the instruments through a translucent vale.

Figure 3:
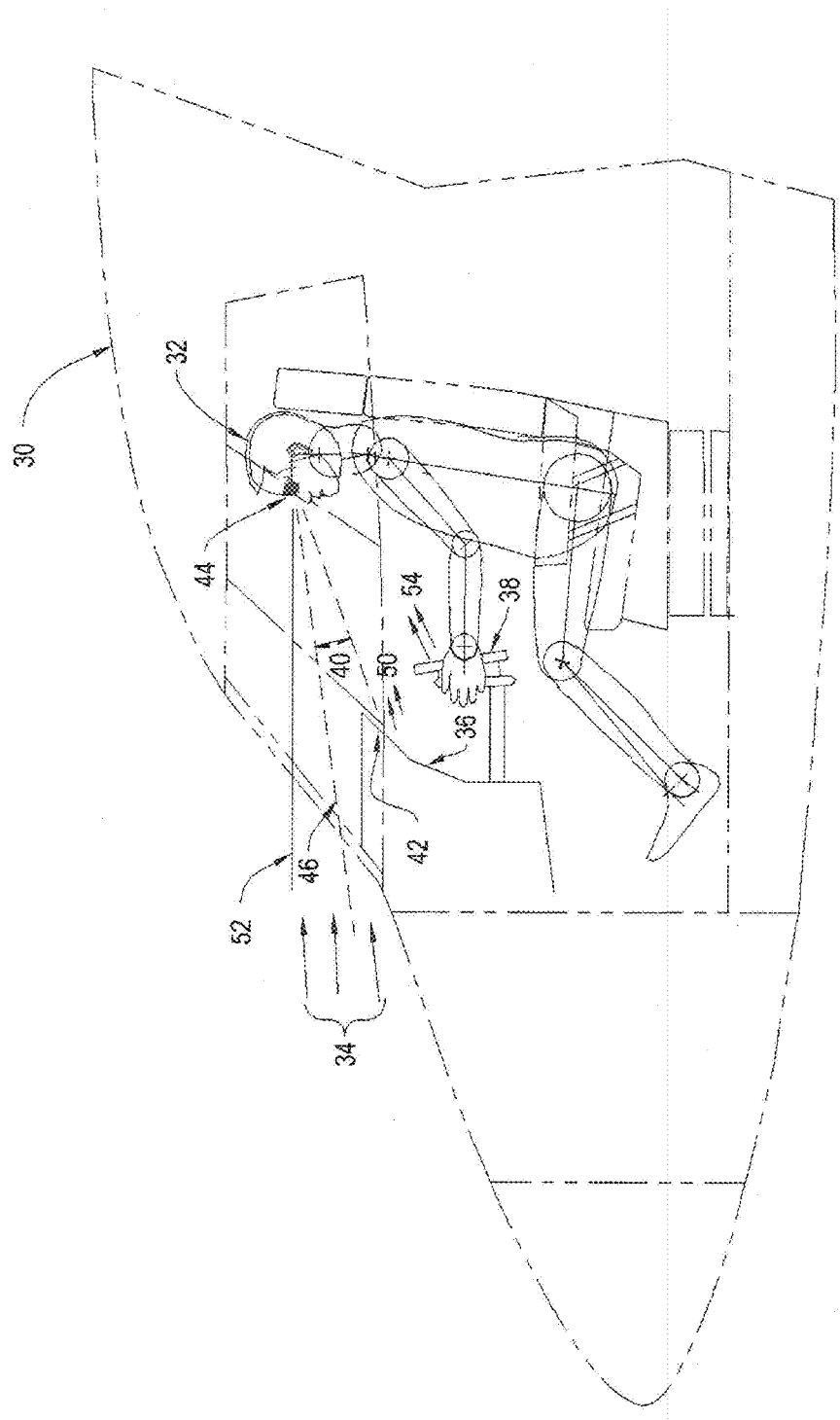
FIG. 3 is a cross-sectional view of an example of an aircraft cockpit showing the approximate location where one of the pilots sits and the differing levels of illuminations from the high ambient light outside the cockpit to the low level of illumination from the instrument panel.

FIG. 3 shows a cross-sectional view of jet aircraft cockpit 30 showing the location where the pilot is seated 32. The pilot 32 typically is required to view outside the aircraft 34, the instrument panel (36 and 42) and paper or an electronic display on what is frequently called the approach plate holder 38.

The pilot 32 frequently has to look back and forth between these three viewing scenes 34, 36 and 38 in rapid succession. The high illumination from outside the cockpit and below the horizontal plane 34 when combined with the small angle 40 formed from the upper part of the instrument panel 42, the pilot's eyes 44 and the lower portion of the airplane's windscreen 46 is a major contributor to the high level of glare experienced by pilots (Equations 2 and 3).

One of the starkest lighting situations between the outside illumination 34 and the lighting from of the instrument panel 50 commonly occurs when flying above a relatively uniform cloud deck with a clear sky above. In this situation, the highest illumination 34 is coming from below the horizontal plane 52. Also in this situation, there can be relatively little direct outside light illuminating the instrument panel (36 and 42). In this case, the illumination from outside the cockpit and below the horizontal plane 52 can be more than 100 times greater than the illumination from the instrument panel (36 and 42).

Under the above lighting situation, if the pilot is wearing sunglasses with sufficiently dark uniform tinting to make viewing outside the cockpit 34 comfortable, viewing the instrument panel (36 and 42) can be difficult because the instruments appear too dark. If the pilot is wearing vignetted sunglasses, high illumination can be admitted to the pilot's eyes from just above the instrument panel 46 from outside the cockpit, which may not help reduce the contrast between the illumination from outside the cockpit 34 and the illumination from the instruments 50. In addition, the high illumination from outside the cockpit 34 admitted to the pilot's eyes can cause unacceptable glare, which renders the instruments hard to read. The severity of the glare is caused in part because of the small angle 40 between the outside illumination 34 and the illumination from the instrument panel 50.

Observations indicate that the illumination from the approach plate holder 54 is usually noticeable brighter than the illumination from the instrument panel (36 and 42). Thus, the pilot is frequently faced with having to view three drastically different illuminated screens.

Figure 4:
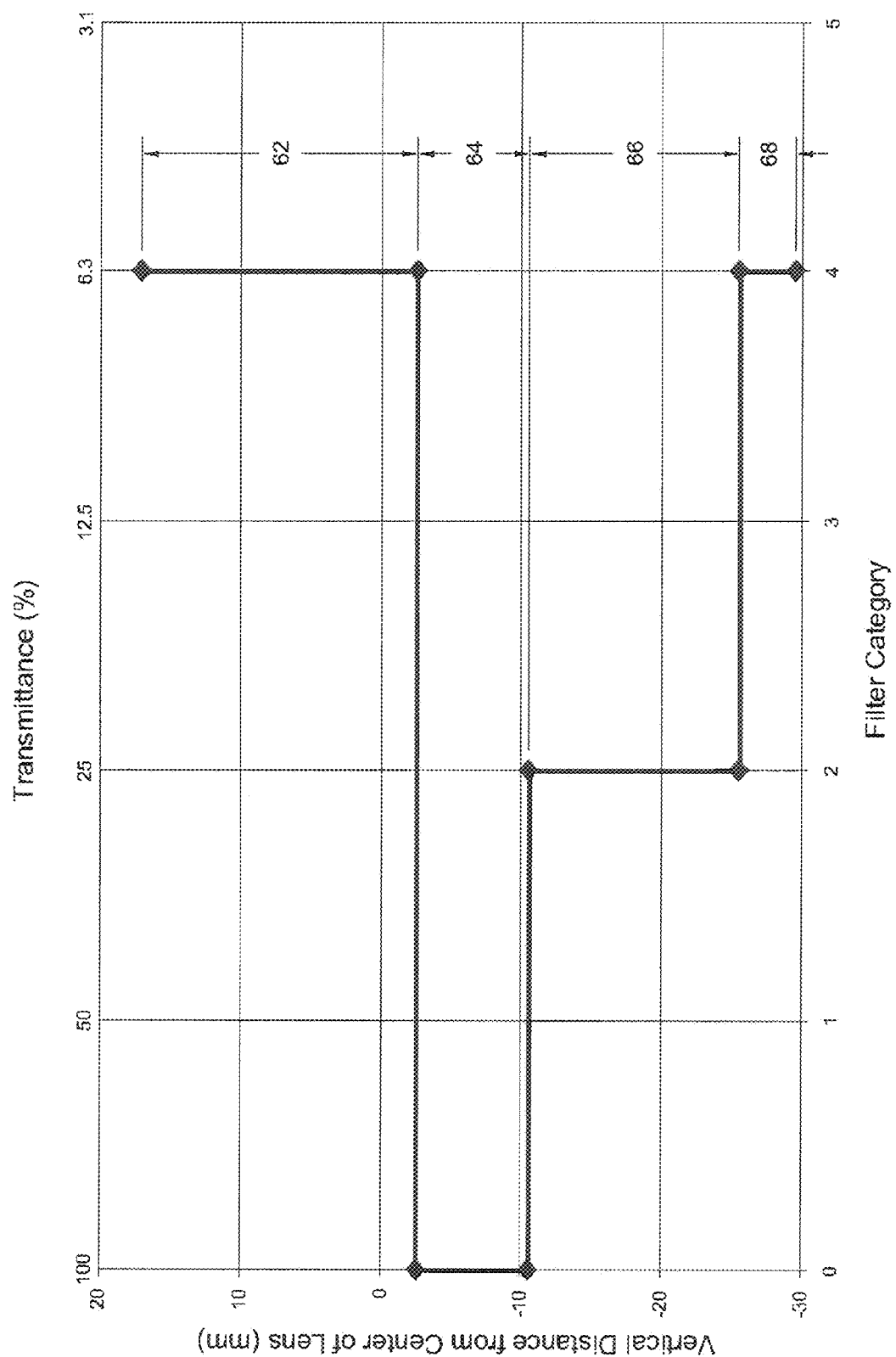
FIG. 4 is a schematic view of the tinting density of the tri-tinted lenses within a system of Cartesian coordinates having in the abscissa (X-axis) the filter category number of the tinting and in the ordinate (Y-axis) the vertical distance from the center of the lens as depicted in FIG. 2.

FIG. 4 shows the density of the tinting as a function of the distance from the center of the lens. The ordinate (Y-axis) is the distance along line ZZ in FIG. 2. There is a discontinuous change in the tinting density between the three fields of vision for the different viewing distances as delineated in FIG. 2 above. On FIG. 4, 62 is the tinting in the far field of vision in FIG. 2 (22), 64 is the clear area in FIGS. 2 (24) and 66 is the tinting on the area on the lens for near viewing. Lastly 68 is the discontinuous transition from the area on the lens for near viewing (FIG. 2, 26) back to the area on the lens for distant viewing (FIG. 2, 22). This lower part of the lens (FIG. 2, 22) is not intended for viewing distant objects but the dark tinting will prevent high illumination for coming into the pilot's eyes especially if the pilot has the need to look vertically at an overhead panel.

The specially tinted lenses mitigate disability glare; however, under some lighting conditions, there can be high ambient light that enters behind and from the sides of sunglasses with the specially tinted lenses, which can cause discomfort glare.

To further reduce glare and improve the pilot's viewing of the instrument panel these special-purpose sunglasses or, in fact, any ordinary sunglasses, can include the detachable sideshades. The detachable sideshade is optical or near-optical quality so as not to degrade the wearer's peripheral vision. The detachable sideshade can vary in rigidity from film material to thicker molded plastic with a design objective to be light in weight and easy to attach and remove. For example, the detachable sideshade may be a unitary piece of film that is held in place on the temple of the eyewear by the elasticity of the material. The detachable sideshade may also be a two-part sideshade formed on the concept of a spring hinge. The hinge is spring-loaded to clasp the temple of the eyewear. The sideshade is removed by opening the clasps against the tension of the spring. Further, the detachable sideshade may be a unitary piece of plastic or a two-part sideshade that has a clasp mechanism. The clasp is removably secured to the temple. The clasp is opened by moving a lever on the sideshade. The mechanism transforms longitudinal movement of the lever into rotational movement of the clasps.

Figure 5:
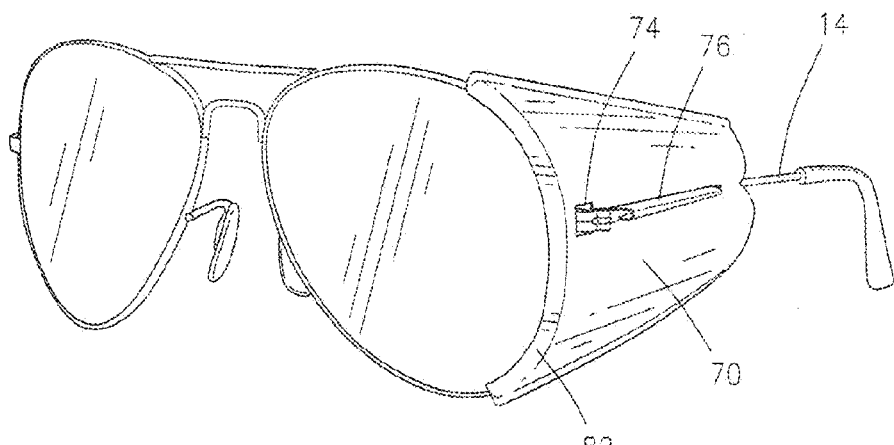
FIG. 5 is an outside perspective view of an example of a pair of sunglasses with a detachable sideshade attached in accordance with an illustrative embodiment of the detachable sideshade disclosed herein.

FIG. 5 shows an outside perspective view of a detachable sideshade made from film or thin plastic. Sideshade (70) is shown attached to the left temple of a pair of aviator style sunglasses. Sideshades that are made from film or thin plastic are not intended as personal protective equipment ("PPE") from flying objects, as specified by the American National Standard Institute in ANSI Z87.1 Standard. Also, these film or thin plastic sideshades are not intended for use in environments having strong winds because they could become dislodged and detached from the eyewear.

The sideshade (70) may be made of one piece of thermoplastic film or thin plastic. The thickness of the film can vary, for example, between 100 and 200 μl. The thickness of the thin plastic may vary, for example between 150 to 300 μm. Formed in the sideshade (70) is a tapered or attenuating channel (76). Towards the front of the sideshade (70), there may be a cutout area and/or cavity (74) within the sideshade (70) to allow for the spectacle hinge. The front portion (78) of the sideshade (70) can have a small overturned area (82) that is essentially perpendicular to the temple (14) or main area of the sideshade (70) and in general arcuate in shape. This overturned area (82) is to prevent un-attenuated light from entering between the spectacle frame and the sideshade and to give the sideshade more structure to maintain its shape.

Figure 6:
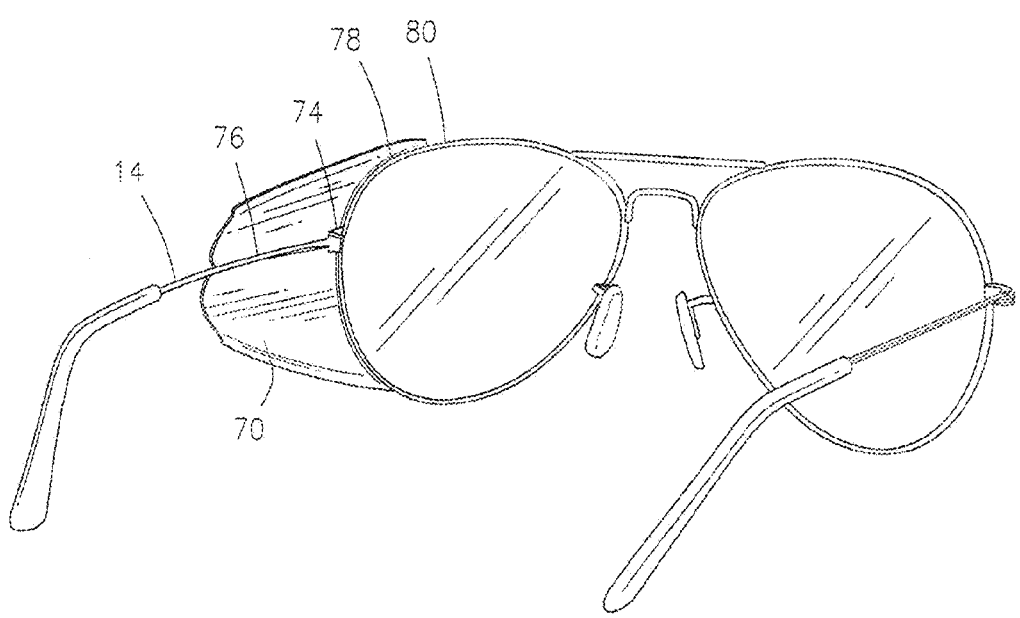
FIG. 6 is an inside perspective view of the pair of sunglasses with the detachable sideshade attached in accordance with the illustrative embodiment of FIG. 5.

FIG. 6 shows an inside perspective view of the sideshades in FIG. 5. At the depth of the channel (76), the sideshade (70) is formed into a section that is cylindrical in shape. The tapered channel (76) receives the temple (14) and the cylindrical section of the sideshade (70) snaps onto the temple (14). The sideshade (70) is held into place by the elasticity of the film or plastic. This gives the sideshade (70) a positive and detachably secured mounting. By allowing the spectacle hinge to pass through the cavity (74) of the sideshade (70), or be enclosed by the sideshade (70) permits the front portion (78) of the sideshade (70) to conform to the outside of the spectacle frame (80). The better the conformity of the sideshade (70) to the frame (80) the better the stability and security of the sideshade (70) is to the frame (80). The front portion (78) of the sideshade (70) may be accurate to conform to the spectacle frame (80); however, the sideshade (70) can be made to conform to any variety of spectacle frame shape, e.g. rectangular.

Longitudinal, i.e., fore and aft, movement of the sideshade is restricted by the overturned area (82) of the front portion (78) of the sideshade (70) and by the cutout area (74) which houses the spectacle hinge. Rotation movement of the sideshade (70) is restricted by the conformity of the front portion (78) of the sideshade (70) with the outside of the spectacle frame (80).

Figure 7:
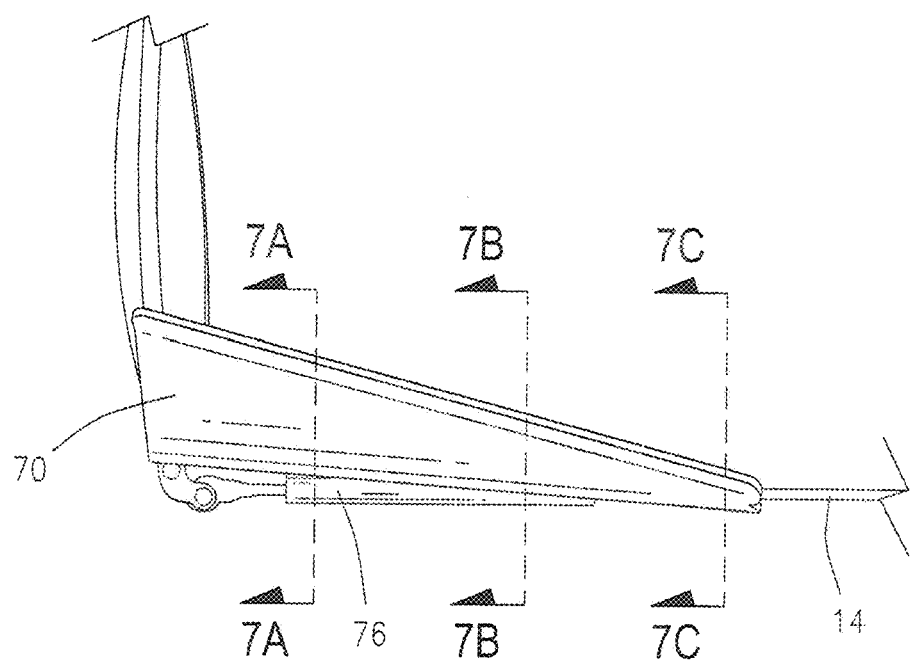
FIG. 7 is a top elevation view of the pair of sunglasses with the detachable sideshade attached in accordance with the illustrative embodiment of FIG. 5.
Figure 7A:
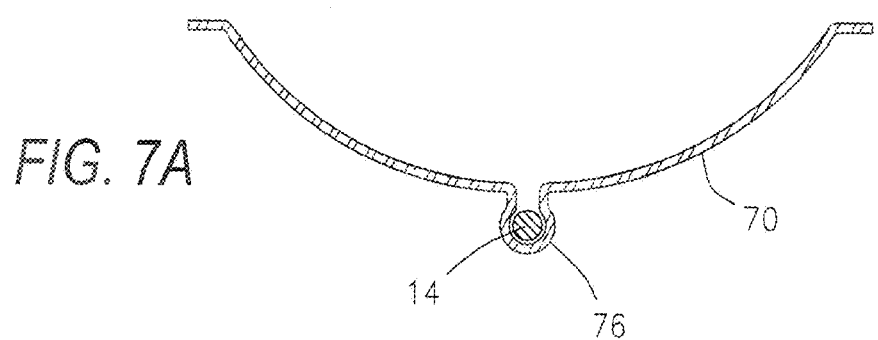
FIG. 7A is a cross-sectional view along line A-A of the detachable sideshade shown in FIG. 7.
Figure 7B:
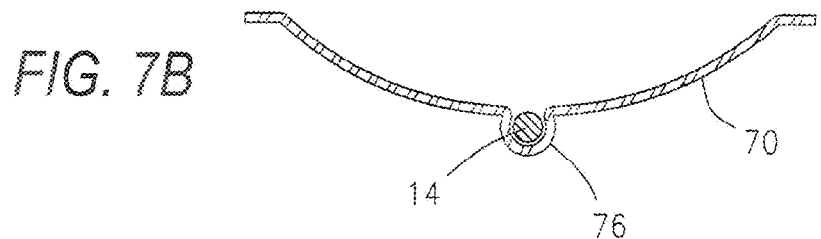
FIG. 7B is a cross-sectional view along line B-B of the detachable sideshade shown in FIG. 7.
Figure 7C:
FIG. 7C is a cross-sectional view along line C-C of the detachable sideshade shown in FIG. 7.

FIG. 7 is a top elevation view of sideshade (70) attached to the spectacle. FIGS. 7, 7A, 7B and 7C shows three cross-sectional views of the sideshade (70) in different locations along the temple (14) (A-A, B-B, and C-C). Shown in FIG. 7 at locations A, B, and C is the cross-section of the sideshade (70) and the temple (14). Towards the front of the sideshade (7A), the tapered channel (76) of the sideshade (70) nearly encloses the temple (14). Moving back along the sideshade (7B), the tapered channel of the sideshade (70) encloses less of the temple (14). Towards the back of the sideshade (7C), the sideshade (70) is only tangent to the temple (14).

The sideshades (70) are not required to be symmetrical about the temple (14) of the sunglasses. The sideshades (70) allow conformity to the sides of the frame (80) of the eyewear and to accommodate for variations in the angle between the temple (14) and frame (80) (pantoscopic angle).

FIG. 8 (views A, B, and C) shows a perspective view of a two-part sideshade with a spring-hinge, capable of being detachably secured onto the temple (14) of the eyewear. The lower and upper parts of the sideshade are shown by (90) and (92) (views A, B, and C). A spring (94) holds the sideshade (70) in a secured position on the temple (14) of the eyewear (FIG. 9). Extending outwards from the outside of the hinge are two tabs (96) and (98) in FIG. 8 (views A and B) that face each other. When tabs (96) and (98) are squeezed together against the tension of the spring (94), the clasps (100) and (102) open and allow the sideshade (70) to be removed from the temple (14). Towards the front portion (78) of the sideshade (70), there may be a cutout area and/or cavity (74) in both the lower and upper parts (90) and (92) of the sideshade (70). The cutout area (74) accommodates a hinge that attaches to the temple (14) of the frame (80) and allows the front portion (78) of the sideshade (70) to conform to the outside of the spectacle frame (80). The material for the two-part spring-hinge sideshade may be plastic with a thickness between 250 and 500 μm.

FIG. 10 (views A and B) shows the sideshade (70) made from a single piece of plastic (110), which may be approximately 500 to 1000 μm in thickness. The sideshade (70) is detachably secured to the temple (14) of the eyewear by the clasping mechanism (116), which may be mounted onto or incorporated the sideshade (70). The clasping mechanism (116) may be opened by moving a lever (112) in the forward direction which opens the clasps (100) and (102) that holds the sideshade (70) onto the temple (14). This lever (112) may be forced forward by the thumb while the index finger is supported by the overturned area (82) on the front portion (14) of the sideshade (70). This clasp mechanism (116) converts longitudinal movement of the lever (112) into rotational movement of a spiral shaft (114) to which half of the clasps (100) and (102) are attached (FIG. 10B). There may be a compression spring that forces the lever (112) back into the closed position to hold the clasps (100) and (102) securely on the temple (14).

The clasp mechanism (116) can be made of a stationary clasp (100) and a clasp (102) that rotates. FIG. 10B shows the stationary clasps (100) and the rotatable clasp (102). The rotatable clasp (102) may have two grips—one at the front of a spiral rod (114) and one at the back of the spiral rod (114). Moving the lever (112) forward between 10 and 15 mm causes the spiral shaft (114) to rotate between 30° and 45°, thus moving the clasp (102) away from the temple (14). The cutout area (74) in the sideshade (70) accommodates the hinge of the spectacles, thus enabling the sideshade (70) to conform closely to the eyewear frame (80).

These sideshades are of optical or near-optical quality and may have medium to exceptionally dark tinting (Filter category between 2 and 6). The tinting can be vignetted horizontally or vertically. The sideshades (70) are to be easily attached to the frame (80) of the sunglasses, without the sunglasses being removed. In addition, the sideshades are to be compatible with headsets that a pilot typical wears. This will enable the pilot to attach or remove the sideshades (70) with minimal distraction while flying the airplane.

The tinting on the sideshades (70) may be neutral density, and the color tintings may be green, brown, gray or yellow. Photochromic sideshades can be used in conjunction with fixed density tinting.

In addition to reducing glare, these sideshades (70) should improve a wearer's peripheral vision.

Whereas, the devices have been described in relation to the drawings and claims, it should be understood that other and further modifications, apart from those shown or suggested herein, may be made within the spirit and scope of this invention.

What is claimed is:

1. A specially tinted lens for spectacles worn by a pilot for use while flying an airplane, said lens comprising;
   a lens body having at least two distinct, contrasting tintings between at least three fields of vision;
   a first tinting for a far field of vision to prevent high illumination from outside said airplane's cockpit from entering said pilot's eyes;
   a second tinting for an intermediate field of vision to enable said pilot to easily see a dimly illuminated instrument panel; and
   a third tinting for a near field of vision to enable said pilot to easily view maps and other information.

2. The specially tinted lens of claim 1 further comprising:
   said first tinting for said far field of vision having a first colored tinting with a filter category number between 2 and 6 (transmittance between 25% and 1.56%), averaged over the visible spectrum;
   said second tinting for said intermediate field of vision having a second colored tinting with a filter category number less than or equal to said filter category number of said first colored tinting; and
   said third tinting for said near field of vision having a third colored tinting with a filter category number greater than or equal to said filter category number of said second colored tinting and less than or equal to said filter category number of said first colored tinting.

3. The specially tinted lens of claim 1 wherein said tintings are discontinuous and sharp between said at least three fields of vision.

4. The specially tinted lens of claim 1 wherein said lens body is a prescription lens.

5. The specially tinted lens of claim 4 wherein said first tinting overlaps with said intermediate field of vision and said near field of vision so as to prevent high illumination from outside said cockpit from interfering with said pilot's viewing of said airplane's instrument panel.

6. The specially tinted lens of claim 1 wherein said tintings are vignetted tinting, color tinting and/or photochromic.

7. The specially tinted lens of claim 1 wherein said lens body includes UV protection, is impact resistant and/or is polarized.

8. The specially tinted lens of claim 1 wherein said first tinting for said far field of vision is tinted green, brown or gray, said second tinting for said intermediate field of vision is tinted yellow, and said third tinting for said near field of vision is tinted neutral in color.

9. A tri-colored lens for spectacles, said lens comprising:
   a lens body having three distinct and contrasting colored tintings for three fields of vision;
   a first colored tinting having a filter category number between 2 and 6 (transmittance between 25% and 1.56%), averaged over the visible spectrum;

a second colored tinting having a filter category number less than or equal to said filter category number of said first colored tinting, averaged over the visible spectrum; and a third colored tinting having a filter category number greater than or equal to said filter category number of said second colored tinting and less than or equal to said filter category number of said first colored tinting, averaged over the visible spectrum.

10. The tri-colored lens of claim 9 wherein said tintings are discontinuous and sharp between at least three fields of vision.

11. The tri-colored lens of claim 9 wherein said lens body is a prescription lens.

12. The tri-colored lens of claim 11 wherein said first colored tinting overlaps with an intermediate field of vision and a near field of vision on said lens body.

13. The tri-colored lens of claim 9 wherein said tintings are vignetted tinting and/or photochromic.

14. The tri-colored lens of claim 9 wherein said lens body includes UV protection, is impact resistant and/or is polarized.

15. The tri-colored lens of claim 9 wherein said first tinting is tinted green, brown or gray, said second tinting is tinted yellow, and said third tinting is tinted neutral in color.

16. Sunglasses, comprising:
a frame;
two lens bodies, each having three distinct and contrasting colored tintings;
a first colored tinting having a filter category number between 2 and 6 (transmittance between 25% and 1.56%), averaged over the visible spectrum;
a second colored tinting having a filter category number less than or equal to said filter category number of said first colored tinting, averaged over the visible spectrum; and
a third colored tinting having a filter category number greater than or equal to said filter category number of said second colored tinting and less than or equal to said filter category number of said first colored tinting, averaged over the visible spectrum.

17. The sunglasses of claim 16 wherein said tintings are discontinuous and sharp between a far field of vision, an intermediate field of vision and a near field of vision.

18. The sunglasses of claim 17 wherein said lens bodies are prescription lenses.

19. The sunglasses of claim 18 wherein said first colored tinting overlaps with said intermediate field of vision and said near field of vision.

20. The sunglasses of claim 16 wherein said tintings are vignetted tinting and/or photochromic.

21. The sunglasses of claim 16 wherein said lens bodies includes UV protection, is impact resistant and/or is polarized.

22. The sunglasses of claim 16 wherein said first tinting is tinted green, brown or gray, said second tinting is tinted yellow, and said third tinting is tinted neutral in color.

* * * * *